US008706043B2

(12) United States Patent
Glezerman et al.

(10) Patent No.: US 8,706,043 B2
(45) Date of Patent: *Apr. 22, 2014

(54) COMMUNICATIONS SYSTEM FOR A HELMET (75) Inventors: Abraham Glezerman, Tel-Aviv (IL);
Avraham Kushnirov, Or-Yehuda (IL);
Yossef Twina, Rosh-Ha'ayin (IL)

(73) Assignee: Cardo Systems, Inc., Pittsburgh, PA (US)

( * ) Notice: Subject to any disclaimer, the term of this patent is extended or adjusted under 35 U.S.C. 154(b) by 420 days.

This patent is subject to a terminal disclaimer.

(21) Appl. No.: 13/011,037

(22) Filed: Jan. 21, 2011

(65) Prior Publication Data

US 2012/0190314 A1 Jul. 26, 2012

(51) Int. Cl.
*H04B 7/00* (2006.01)

(52) U.S. Cl.
USPC ................. 455/66.1; 455/575.2; 455/90.3

(58) Field of Classification Search
USPC ........................................... 455/66.1
See application file for complete search history.

(56) References Cited

U.S. PATENT DOCUMENTS

| 5,438,702 A | 8/1995 | Jackson |
| 6,546,264 B1 | 4/2003 | Kennedy |
| 2003/0036360 A1 | 2/2003 | Russell et al. |
| 2006/0057972 A1* | 3/2006 | Wikel et al. .................. 455/90.3 |
| 2008/0143954 A1* | 6/2008 | Abreu ........................... 351/158 |
| 2011/0219522 A1* | 9/2011 | Petitt ................................ 2/422 |

FOREIGN PATENT DOCUMENTS

| FR | 2827744 | 1/2003 |
| JP | 2002/289030 | 10/2002 |

* cited by examiner

Primary Examiner — David Bilodeau
(74) Attorney, Agent, or Firm — Leason Ellis LLP (57) ABSTRACT A communications system is configured to attach to a helmet that includes vent openings formed in an outer shell of the helmet. Components of the system are configured to extend through the openings of the helmet for detachably coupling the components to the helmet. The system can include a main communications module that includes electronic components and a control panel and the system can further include other audio components that include speakers and a microphone. The system also provides the ability to communicate with and/or operate as a digital media player, a radio tuner, a telephone, or a global positioning system (GPS) or another device using Bluetooth technology.

24 Claims, 7 Drawing Sheets

COMMUNICATIONS SYSTEM FOR A HELMET

TECHNICAL FIELD

The present invention relates to communication systems and more particularly, relates to a communication system that fits within the confines of a helmet which is worn during various activities and provides a wired or wireless connection to at least one component that is associated with the helmet from a separate source of intercommunications or entertainment system that is also associated with the helmet, both components being preferably removable from the helmet.

BACKGROUND

It will be appreciated that there are number of different types of helmets that are used across many different industries; however, they all are a form of protective gear. For example, wearing hard hats is standard practice when working in a construction site, as well as when operating heavy industrial equipment, etc. Sports athletes, such as baseball and football players, also wear helmets for protection and it is one of the most critical pieces of equipment for a professional race car driver. Helmets are also used in the military services. One type of helmet that is one of the most commonly seen is a bicycle helmet.

In fact, in most states, the wearing of a bicycle helmet is mandatory by law for all riders or at least riders that are less than a certain age. In certain events or situations, such as a group ride or a professional cyclist or policeman cyclist, etc., it would be advantageous for the riders to have the capabilities to communicate amongst each other in a safe manner. Since bicycle riding requires that both hands of the rider be placed on the handle bars, it is out of the question that for the rider to hold a communications device while riding the bicycle. In addition, in most applications, it is very difficult to fit electronic equipment, including speakers and the like, within the tight confines of the helmet due to the construction of the helmet itself. In addition, the installation and removal of such equipment is also a challenge.

As is well known, Bluetooth is an industrial specification for wireless personal area networks (PANs). Bluetooth provides a way to connect and exchange information between devices, such as mobile phones, laptops, personal computers, printers, GPS receivers, digital cameras and video game consoles over a secure, globally unlicensed short-range radio frequency. One of the more prevalent applications of Bluetooth is the wireless control of and communication between a mobile phone and a hands-free headset that allows the transfer of sound data between the two devices.

The present assignee has a number of products that are commercially available and are marked to motorcycle riders. These products are typically wireless communications units that are adapted to be attached to motorcycle helmets and each includes a device that interfaces with the Bluetooth functionality of the user's mobile phone.

One segment of the industry that has not been addressed is the incorporation of a communications or entertainment system into a conventional bicycle helmet and therefore, there is a perceived need to provide such device that easily mounts to a conventional bicycle helmet.

SUMMARY

In accordance with the present invention, a communications system is configured for use with a helmet that includes vent openings formed in an outer shell of the helmet. The system includes a main communications module that is configured to be attached to an exterior of the outer shell of the helmet. The main communications module includes a base portion that contains the electronics and another separate part that is mounted to the helmet by being passed through openings of the outer shell. The base portion is removably attached to the separate part that is mounted to the helmet. The base portion is attached to the separate part such that a location of the base portion can be adjusted relative to the separate part.

The system also includes a first audio component that is formed of an elongated body that has a flexible base portion and a speaker that extends outwardly from the base portion. The base portion includes a first mechanical attachment member for securely, yet releasably, attaching the first audio component to a second mechanical attachment member located inside of the outer shell of the helmet proximate one ear of a user. The first audio component is in communication with the main communication module.

The system also includes a second audio component that is formed of an elongated body that has a flexible base portion and a speaker and microphone that extend outwardly from the base portion. The base portion includes the first mechanical attachment member for securely, yet releasably, attaching the second audio component to the second mechanical attachment member located inside of the outer shell of the helmet proximate the other ear. The second audio component is in communication with the main communication module.

The first and second mechanical attachment members permit a location of the first and second audio components within the inside of the outer shell to be readily changed, thereby allowing a user to adjust the first and second audio components based on user preference.

The main communications module includes an electronic module that includes controls. The electronic module is configured to communicate with and/or operate as a digital media player, a radio tuner, a telephone, or a global positioning system (GPS) and to have intercom communications with another communication module using Bluetooth technology.

BRIEF DESCRIPTION OF THE DRAWING FIGURES

The foregoing and other features and advantages of the present invention will be more readily apparent from the following detailed description and drawings of the illustrative embodiments of the invention wherein like reference numbers refer to similar elements and in which.

DETAILED DESCRIPTION OF EMBODIMENTS

In accordance with one embodiment of the present invention, an electronic communications or entertainment system 100 for use with a helmet 200 is shown in FIGS. 1-5. While the helmet 200 that is illustrated in FIGS. 1-5 is a conventional bicycle riding helmet, it will be understood that the helmet 200 is not limited to being this type of helmet; but rather, the helmet 200 can be any number of other types of helmets that have similar construction such that the communications system 100 can be detachably mounted to the helmet 200.

As shown in FIGS. 1-5, the bicycle helmet 200 is typically formed of the basic components that work together to provide protection in the helmet 200; namely, an outer shell 210 and a retention system 250.

One of the other predominant characteristics of the helmet 200 is the inclusion of openings 220 within the outer shell 210 of the helmet 200. These openings 220 provide venting and airflow to the wearer's head without jeopardizing safety. The openings 220 can be in the form of elongated openings or slots formed in the outer shell 210. These openings 220 provide an aerodynamic look as well to the outer shell 210. The openings 220 are spread across the outer shell 210 of the helmet 200 and are thus located in different regions of the outer shell 210 including the top and sides of the helmet 200. The openings 220 can be formed adjacent one another and as shown in the top view of FIG. 2, a portion 215 of the outer shell 210 that is located between side-by-side openings 220 forms a support surface.

It will be appreciated that the helmet 200 described herein is merely one exemplary type of helmet and in no way limits the communications system 100 of the present invention which is configured to and intended for use with any number of different types of helmets, including the type shown herein as well as other types of helmets.

In accordance with the present invention, an electronic communications or entertainment system 100 is provided and is designed to be used with a conventional helmet like bicycle helmet, such as helmet 200. As described below, the system 100 is designed to be easily and securely mounted to the helmet 200, while at the same time, the system 100 can be easily removed from the helmet 200. For example, after use of the helmet, the user can simply remove and store the system 100 for a future use.

When the system 100 is in the form of a communications system 100, it is configured to allow communication with another component, such as a mobile telephone. For example and as described in detail below, the electronic communications system 100 can be configured to be part of a Bluetooth communications system in which the communications system 100 that is mounted to the helmet 200 communicates wirelessly with another device, such as a Bluetooth capable mobile telephone or other type of communication device. For example, the communications system 100 can communicate with another communications system 100 worn by a different person.

In the illustrated embodiment, the system 100 includes a base communications module 300 that contains the communication components of the system 100. The base communications module 300 includes a housing (base portion) 310 that stores the communication components as well as other electronic components that are part of the system.

The electronics of the module 300 also include an accessible control panel or controller that has a number of accessible controls 305 that allows the wearer to control the communications system and preferably includes a display, such as a display screen. For example, the module 300 includes a number of controls 305 that are accessible along an outer surface of the housing 310 with the illustrated base module 300 including buttons 305 or like that permit the user to operate the device. The control panel 305 is operatively connected to the printed circuit board via wires or the like. The control panel 305 includes a number of different buttons that control the functionality of the communications system 100.

In one embodiment, the control panel 305 can include a control button which when pressed anywhere within range of the other Bluetooth device (e.g., mobile phone) causes the power to be turned ON/OFF and allows the user to accept or initiate calls. In addition, the control panel 305 also includes a volume down button and a volume up button. The buttons include indicia to indicate their functionality. For example, a telephone symbol for the button that switches to telephone mode, a minus symbol for the button that decreases the volume and a plus symbol for the button that increases the volume.

The buttons or controls can allow the user to scroll through menus, make various selections and change the operating parameters of the device, vary different controls, such as volume, etc. As described below, when the module 300 is in the form of an entertainment system, the buttons can include traditional media buttons, such as a play button, a stop button, rewind, forward, etc.

The module 300 can also include a display which permits different content, including current settings and current operation modes, to be viewed by the user. The display can be located along a top surface of the module 300; however, other locations, such as one side, are equally possible.

In the illustrated embodiment, the housing 310 has an elongated shape to permit it to be easily mounted to the helmet 200 along the outer shell 210. Since the module 300 is, in the illustrated embodiment, mounted to the top of the outer shell 210, the shape of the housing 310 is preferably aerodynamic, like the outer shell 210 itself, so that it channels and does not excessively impede air flow along the outer shell 210.

In accordance with the present invention, different techniques can be used to mount the module 300 to the helmet 200. For example, the module 300 can include a lower base plate that is configured to mount to a complementary mounting structure that is part of the helmet 200.

Figure 1:
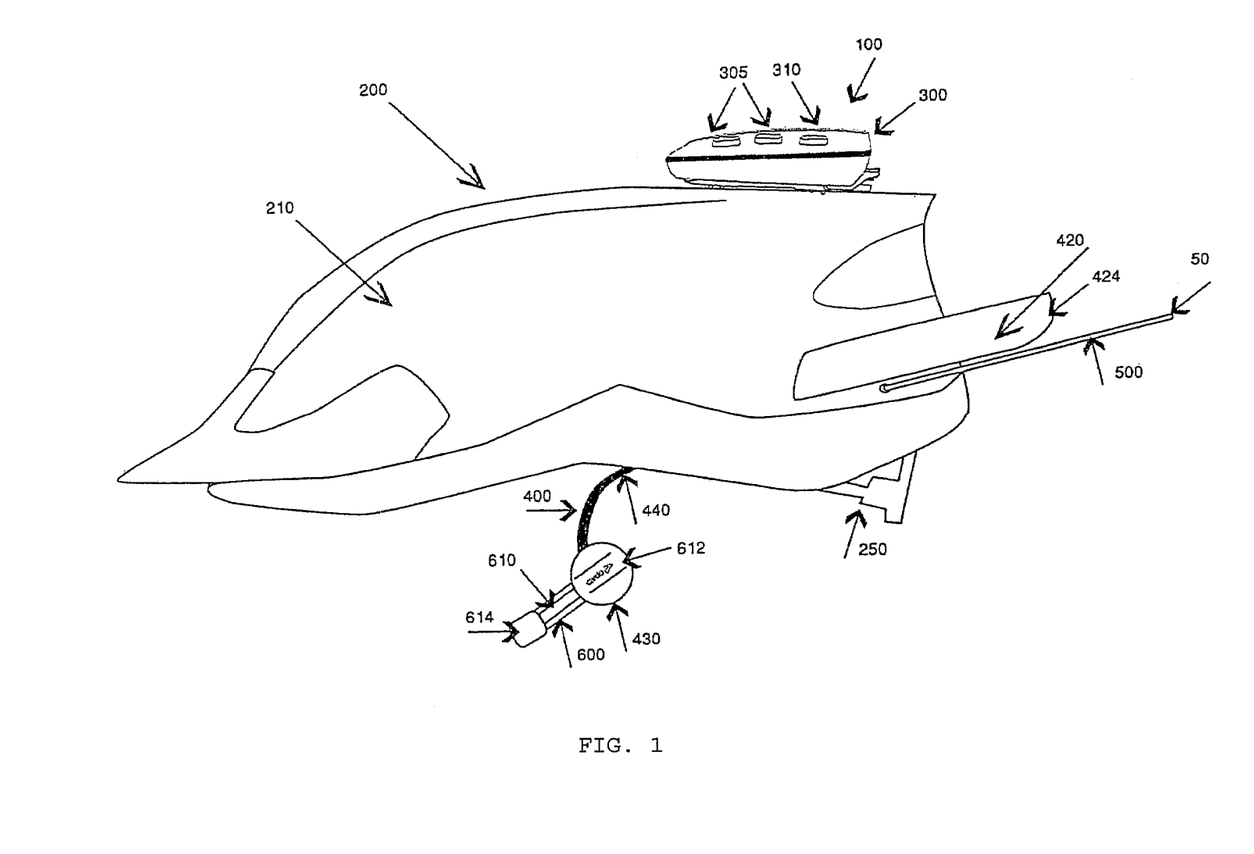
FIG. 1 is a left side elevation view of a communications system for use with a helmet, such as bicycle helmet.
Figure 2:
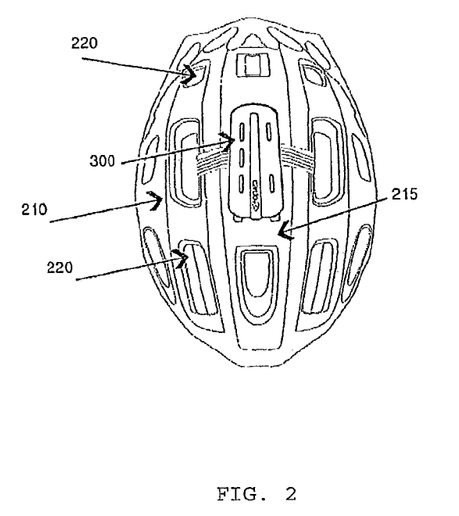
FIG. 2 is a top plan view of the communications system of FIG. 1 that is used with a helmet.
Figure 3:
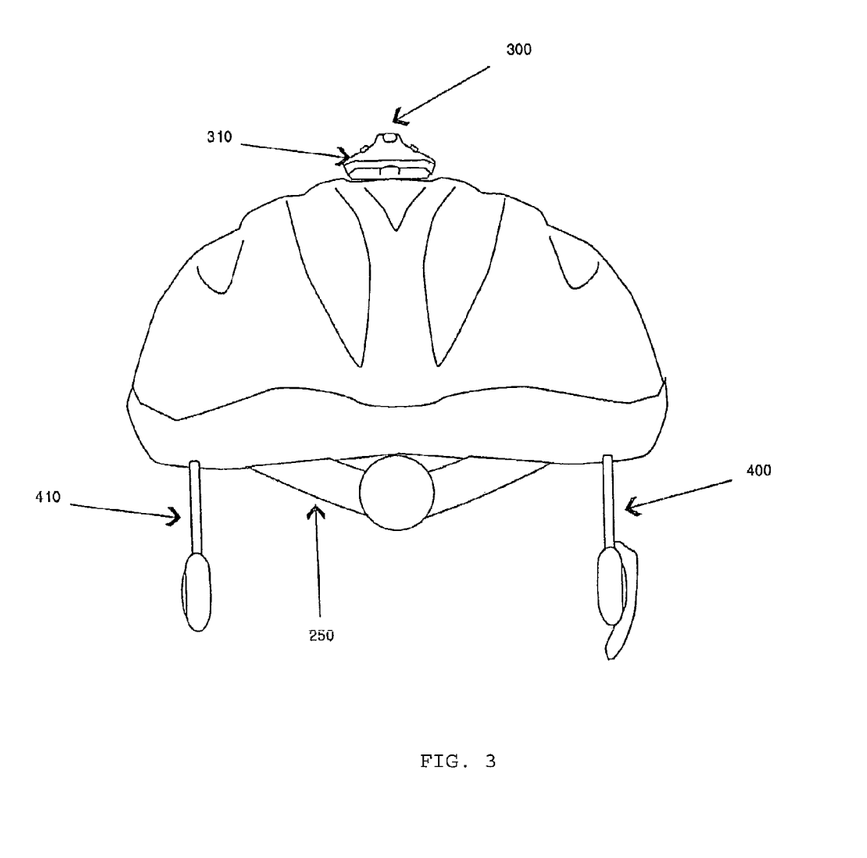
FIG. 3 is a front view of the communication system of FIG. 1 that is used with a helmet.
Figure 4:
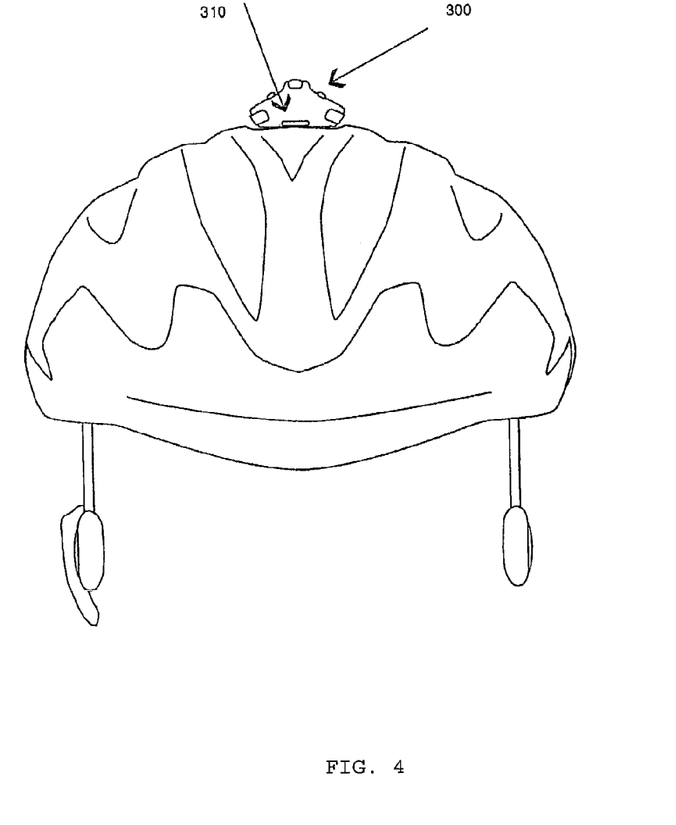
FIG. 4 is a rear view of the communication system of FIG. 1 that is used with a helmet.
Figure 5:
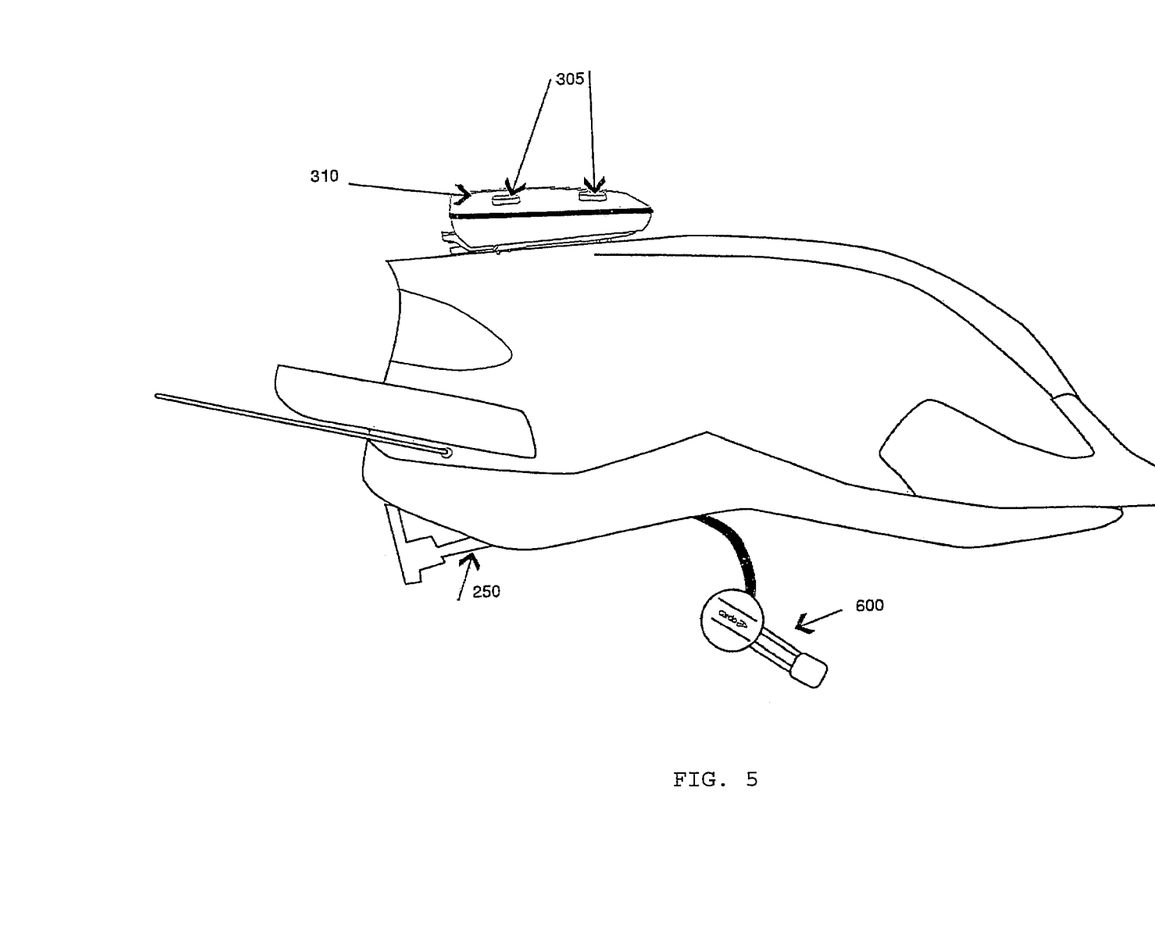
FIG. 5 is a right side elevation view of a communications system for use with a helmet, such as bicycle helmet.
Figure 6:
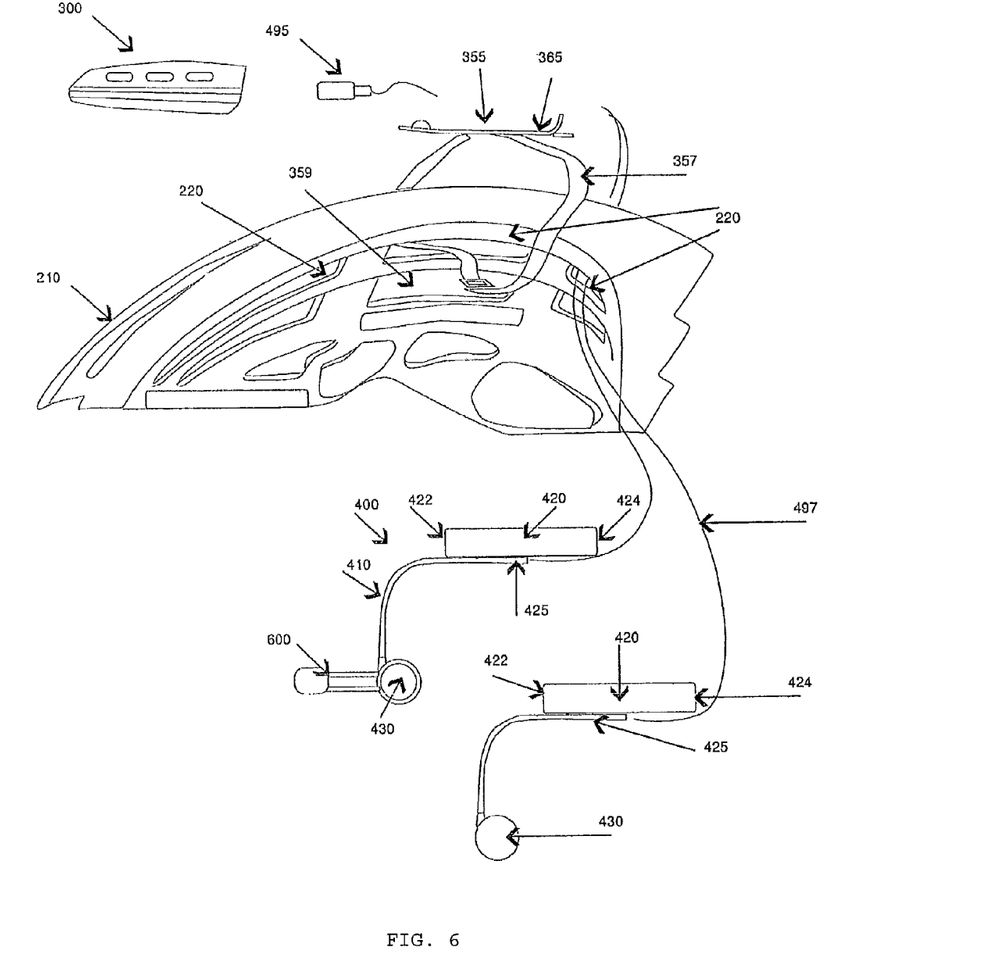
FIG. 6 is an exploded view of different components of an exemplary communications system for use with a helmet shown in cross-section.
Figure 7A:
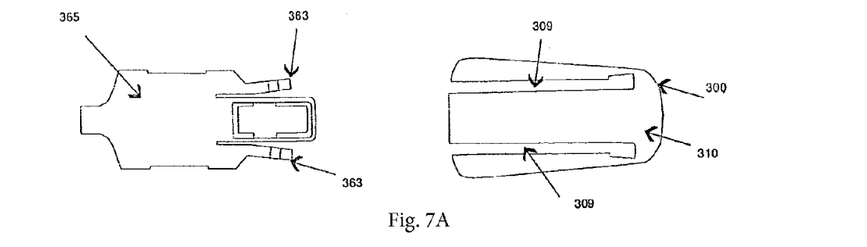
FIGS. 7A-7D are cross-sectional views of a main electronic module and retaining plate showing steps for securely attaching the main electronic module to the helmet.
Figure 7B:
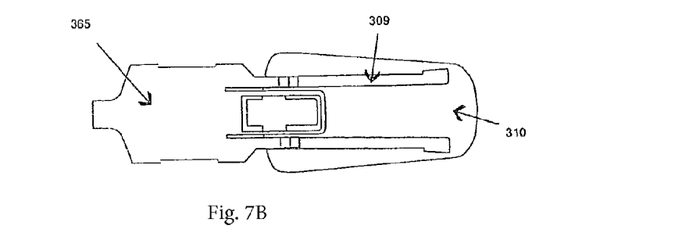
Figure 7C:
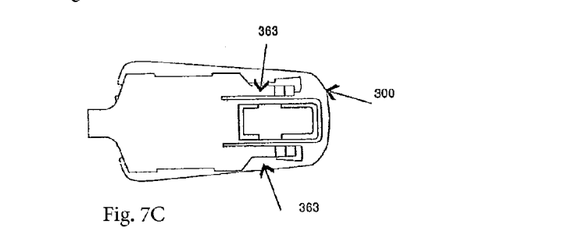
Figure 7D:
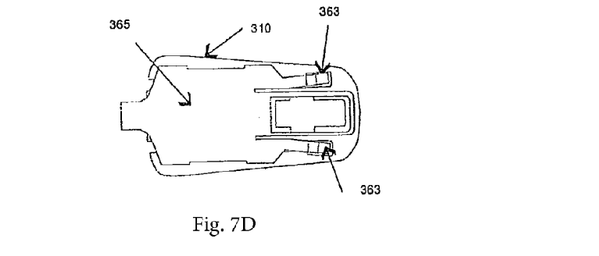

With reference to FIG. 6, in the illustrated embodiment, the module 300 is constructed to be mounted to the helmet 200 using a coupling member 355 that is detachably attached to the helmet 200 and is separate from the module 300. The coupling member 355 is a flexible structure and can be in the form of an elongated flexible strap 357 that has two ends with a free first end 357 and a second end that contains a fastening element 359. The fastening element 359 can be in the form of a buckle type fastener. The strap 357 can be formed of any number of suitable materials, including synthetic materials, such as nylon, etc. The strap 357 includes one or more fastening elements. For example, the fastening element can be in the form of pieces of hook and loop material that permit the strap 357 to be attached to itself to form a continuous loop by folding over the strap 357 and pressing two portions of the strap 357 together.

As shown in FIGS. 6 and 7A-D, the coupling member 355 also includes a base (coupling or locking member) 365 that is adjustably disposed along the strap 357 so that the position of the base 365 relative to the strap 357 can be adjusted. The base 365 can have a slot or the like that receives the strap 357 and permits the base 365 to be adjusted along the strap 357. The base 365 has a coupling or locking mechanism that is designed to engage with complementary features formed as part of the housing 310 of the module 300. For example, the locking mechanism can be in the form of a pair of flexible locking fingers 363. The base 365 interlockingly engages the housing 310 by disposing the fingers 363 into two openings or slots 309 formed in the housing 310 so as to releasably lock the module 300 to the coupling member 355. As shown in FIGS. 7A-D, the locking fingers 363 are naturally biased outward and the slots 309 include locking recesses that receive a portion of the locking fingers 363 to thereby lock the fingers 363 in the housing 310. To release the base 365 from the module 300 and vice versa, the fingers 363 are biased inwardly (flexed), thereby allowing disengagement between the two components and the module 300 is then pulled from the coupling member 355.

The coupling member 355 is attached to the helmet 200 by passing the strap 357 through one more openings 220 of the helmet 200. For example, the first end of the strap 357 is fed through a pair of openings 220 of the helmet 200 and is then fed through the opening of the fastening element 359 before then being looped over on top of itself. Hook and loop elements (not shown) that are provided along the strap 357 permit the strap 357 to be secured to itself by mating the complementary hook and loop elements. This results in the coupling member 355 being securely attached to the outer shell of the helmet 200.

The module 300 is then attached to the coupling member 355 as described above resulting in the module 300 being attached to the helmet 300.

It will be appreciated that the module 300 can be attached to the helmet 200 using different techniques than the ones described hereinbefore. For example, the base portion (housing 310) can have any number of different constructions including a clip-like construction that is constructed to mate with the outer shell 210 as by engaging one or more openings 220 formed in the outer shell 210. In addition, the helmet and module can include complementary fastening elements including but not limited to the use of a buckle type fastener or button type fastener or clasp type fastener, or a snap-fit attachment between the module 300 and the outer shell 210.

In another embodiment, the helmet 200 can be specially constructed so that it is complementary to the module 300 and more specifically, the outer shell 210 can be formed to include locking features that mate with locking features that are part of the module 300. For example, the bottom or base of the module 300 can include locking prongs or tabs that interlockingly mate with complementary features formed in the outer shell 210. In this manner, a snap-fit can be formed between the module 300 and the helmet 200; however, the module 300 can be removed at any time by disengaging the module 300 from the helmet 200. In this embodiment, the helmet 200 and system 100 can be marketed and sold together.

It will be appreciated that the module 300 includes electronics, including a printed circuit board, a battery, etc., that are disposed in a concealed location within the housing 310. The module 300 can operate in any number of different manners to provide communications functionality and/or entertainment functionality. For example, the electronics of the module 300 can be designed to communicate with a cellular phone or the like so that the user can both receive telephone calls and can make telephone calls using the module 300. In addition, the module 300 can be configured so as to be compatible with a global positioning device (GPS) device so that directions that are generated by the GPS device can be heard by the user (wearer of the helmet). The controller (software) of the module 300 can be programmed to include a number of different operating modes such as one where GPS generated directions take priority over other communications, such as cellular phone communications and entertainment transmissions and therefore, when GPS directions are generated, the user hears these directions, while other ongoing communications or transmissions are muted.

As mentioned herein, the module 300 can also function as a device that provides musical entertainment to the user and in particular, the module 300 can function as a digital media player (e.g., MP3 player) and can also include an FM tuner so as to allow the user to receive FM transmissions. The module 300 can also provide intercom-communications with another module 300.

The controls associated with the module 300 permit the user to select from the different operating modes or to turn the module 300 on or off.

Another part of the communications/entertainment system 100 is pair of audio components that are also designed to releasably mount to the helmet 200 (e.g., inside of the outer shell 210 thereof). In the illustrated embodiment, a first audio component 400 is intended to be worn proximate the left side of the wearer's head and a second audio component 410 is intended to be worn proximate the right side of the wearer's head. The first and second audio components 400, 410 can be identical, similar or different from one another depending upon the particular application. In the illustrated embodiment, the first and second audio components 400, 410 are slightly different from one another in that the second audio component 410 includes a microphone 600, while the first audio component 400 does not.

The first audio component 400 includes a base or attachment portion 420 and a speaker 430 that is connected to the base portion 420 by means of a connector 440. The speaker 430 is of a headphone type and can be either the type that is at least partially inserted into the user's ear, worn around the ear or is simply located proximate to but not necessarily in contact with the ear. In the illustrated embodiment, the speaker 430 has a round shape and is intended to be either placed in or placed proximate the wearer's ear.

The connector 440 is preferably constructed of a material that has some flexibility to accommodate the normal wear and the normal forces that may be applied thereto during normal bicycle riding. By being formed of a flexible material, the connector 440 can also be adjusted to allow better positioning of the speaker 430 relative to the ear. The connector 440 can be an elongated hollow tube-like structure that attaches at one end to the speaker 430 and at the other end to the base portion 420 and is able to withstand normal forces and contact that occur during cycling. When the connector 440 is formed from a flexible (pliable) material, the connector 440 can be readily bent to allow more optimal positioning of the speaker 430 near the ear. The connector 440 is also formed so that wires and the like can pass therethrough and be routed the length of the connector 440.

The connector 440 can also be curved or bent as illustrated. For example, the connector 440 can be bent to have generally a 90 degree angle which results in the speaker 430 being placed proximate the ear when the helmet 200 is worn. The degree of the angle can be altered by simply bending the connector 440 along its length (when the connector is formed of a flexible material) to provide more optimal positioning of the speaker 430.

The base portion 420 has an elongated shape and includes a first end 422 and an opposing second end 424 and a side edge 425. The connector 440 attaches to the base portion 420 and in the illustrated embodiment, the connector 440 attaches to the base portion 420 along the side edge 425. For example, along the side edge 425, there can be a plurality of plastic clips or the like disposed in alternating fashion so as to allow the round connector 440 to be captured between the clips, thereby releasably securing the connector 440 to the base portion 420.

The illustrated base portion 420 is in the form of a flexible piece of material, such as a flexible strap-like piece of material formed of synthetic material to permit it to be readily placed into a position that compliments the contour and shape of the inside of the outer shell. As shown in FIG. 6, the connector 440 can extend along a significant length of the side edge 425 of the base portion 420. The base portion 420 either includes or is compatible with hook and loop material so as to permit the base portion 420 to be easily attached to another object that includes hook and loop material. For example, the base portion 420 can include be completely formed of or include hook and loop material as a part thereof. As explained in more detail below, the base portion 420 is then attached to the helmet by mating the base portion 420 with a hook and loop material that is associated with the helmet. For example, the interior of the helmet 200 can include hook and loop material located along sides thereof to permit the component 400 to be attached to the helmet 200.

The connector 440 is a hollow member that allows wires and the like to be routed therethrough to connect the audio components, such as the speaker 430, to the other working components of the device 100.

As shown in FIG. 6, the audio components 400, 410 can be electronically connected to the module 300 by means of wires and a connector 495. In particular, each audio component 400, 410 has one or more wires 497 extending therefrom (e.g., extending from the connector 440) that terminate together in the connector 495. The connector 495 is designed to electronically connect the audio components 400, 410 to the module 300. For example, the connector 495 can be of a male and female type with the module 300 including a connector of the opposite type. The connector 495 can thus be plugged into the module 300, thereby establishing an electrical connection between the two.

It will also be appreciated that alternatively, the audio components 400, 410 can communicate wirelessly with the module 300 and in this embodiment, an antenna 500 or the like can be included and coupled to the base portion 420. For example and as shown, the antenna 500 can be an elongated member (e.g., pencil or wire like in nature) that is attached to the base portion 420 and extends in a direction opposite from the connector 400. In other words, the antenna 500 extends rearwardly toward the free end 424 of the base portion 420. Conversely, the connector 440 extends forward from the end 422 of the base portion 420. The antenna 500 can have a length such that a free end 502 of the antenna 500 extends beyond the free end 424 of the base portion 420. The antenna 500 is used to receive and/or transmit signals from the audio component 400, 410 to another component, such as the module 300. It will also be appreciated that instead of an external antenna, an internal antenna can be used.

The difference between the audio component 400 and the audio component 410 is that the first audio component 400 includes the microphone 600 that has a flexible boom 610 that extends outwardly from the speaker 430. The microphone boom 610 is an elongated structure that extends forwardly toward the front of the helmet 200 and includes a first end 612 that is attached to the speaker 430 and an opposing second end 614 that contains the microphone unit into which the wearer speaks. The boom 610 is formed of a flexible material so as to allow optimal positioning of the microphone unit to the wearer's mouth.

One exemplary manner of attaching the audio components 400, 410 to the module 300 is now described and in particular, the present invention provides a mechanical solution for attaching and securing the communication system parts to the helmet 200. The user can first attach hook and loop material to the inside of the helmet 200 at particular locations that permit the audio components 400, 410 to be mounted to the helmet 200 at locations that position the speakers and microphone near the ears and mouth, respectively, of the user. For example, strips of hook and loop material that have an adhesive backing can be attached to the inside of the helmet 200. Next, the base portions 420 of the audio components 400, 410 are attached to the inside of the helmet 200 by mating the hook and loop material of the base portions 420 with the hook and loop material that is associated with the inside of the outer shell of the helmet 200. For example, the user can simply press the base portions 420 into intimate contact with the hook and loop material of the inside of the helmet, thereby attaching the audio components 400, 410 to the helmet 200. The user can adjust the location of the audio components 400, 410 within the helmet 200 by simply readjusting the position of the audio component 400, 410 along the hook and loop material that is associated with the helmet. This permits the audio components 400, 410 to be properly positioned relative to the ears and mouth of the user.

The wires 497 that extend from the two audio components 400, 410 are disposed within the interior of the helmet 200 and the connector 495 is fed through one of the openings 220 of the helmet 200 for attachment to the main module 300 as described below.

The main unit (module 300) is attached to the helmet 200 by passing the strap 357 through one more openings 220 of the helmet 200. For example, the first end of the strap 357 is fed through a pair of openings 220 of the helmet 200 and is then fed through the opening of the fastening element 359 before then being looped over on top of itself. The hook and loop elements that are provided along the strap 357 permit the strap 357 to be secured to itself by mating the complementary hook and loop elements. This results in the coupling member 355 being securely attached to the outer shell of the helmet 200.

The connector 495 is then attached to the mating connector structure that is part of the main module 300, thereby connecting the speakers and microphone of the system to the main module 300.

Since the mechanical attachment (hook and loop) between the audio components 400, 410 and the helmet 200 and between the main module 300 and helmet 200 is of a releasable type, the components 400, 410 and main module 300 can be easily removed from the helmet 200.

FIGS. 1-5 show an alternative design where the main portion 420 passes through an opening 420 formed in the helmet 200; however, the means for releasably attaching the main portion 420 to the helmet 200 is still a mechanical attachment, such as the above described hook and loop fasteners. While, the preferred location for the hook and loop material is within the interior (inside) of the helmet, it will be appreciated that the hook and loop material can be placed along the exterior of the outer shell 210 which would result in the main portions 420 extending more along the exterior of the outer shell 210 of the helmet 200.

It will also be appreciated that according to another embodiment, a section of the base portion 420 can be provided with a first fastener that mates with a complementary second fastener that is associated with the outer shell of the helmet 200. The base portion 420 can thus be snap-fittingly mated with and/or otherwise be mechanically attached to the outer shell 210 of the helmet 200.

There are other means for attaching the audio components 400, 410 to the outer shell 210 in a manner that permits the audio components 400, 410 to easily be detached from the outer shell 210.

It will therefore be appreciated that the exemplary communication system described herein can be distributed as a set that comes with instructions for attaching the system to the outer shell 210. Thus, the system can be retrofittable so that it can attach to existing helmet designs.

The communication systems disclosed herein are thus suitable for use with a bicycle style helmet that includes openings within the hard outer shell of the helmet. The components of the communication system can be easily attached to the outer shell and provide a complete communication system that offers the user a multimedia experience, including a digital music player, a radio, a navigation system, a GPS system, cell phone, intercom to other module, etc., all the can be controlled by a single module that is directly attached to the helmet.

In addition, as disclosed herein, the helmet itself can be constructed to be complementary to the main module and the audio components to allow the various components to be attached to the helmet. For example, the helmet can include integral fastening features that permit the components to be attached to the helmet. Besides snap-fit fastening means, as described herein, the helmet can include locking slots formed of two opposing guide rails that receive a protrusion or tab that is part of the component. The component mates with the helmet by sliding the protrusion into the locking slot, thereby locking the component to the helmet. The protrusion can include a locking tab or the like that is configured to lock the component to the helmet. In one embodiment, the pair of opposing guide rails can be in the form of opposing L-shaped rails that define a locking slot between one leg thereof and the outer shell 210. The protrusion can be a curved structure depending upon the location on the helmet where the component mates with the helmet. In this manner, to lock the respective component to the helmet, the locking protrusion (tab) is slid in one direction into the locking slot.

While exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the art without departing from the scope of the present invention as set forth in the claims that follow, and equivalents thereof. In addition, the features of the different points set forth below may be combined various ways in further accordance with the present invention.

What is claimed is:

1. A communications system for a helmet that includes vent openings formed in an outer shell thereof comprising:
a main communications module that is configured to be attached to an exterior of the outer shell of the helmet;
a first audio component that is formed of an elongated body that has a flexible base portion and a speaker, wherein the base portion includes: (a) a first mechanical attachment member for securely, yet releasably, attaching the first audio component to an inside of the helmet proximate one ear of a user so as to the speaker to hover relative to the one ear but not be in contact therewith when the helmet is worn, and (b) a flexible elongated portion that attaches the speaker to the first mechanical attachment member and is configured to bend to assume a desired position in which the speaker hovers relative to the one ear, while the first mechanical attachment member remains attached to the inside of the helmet, the first audio component being in communication with but spaced from the main communication module; and
a second audio component that is formed of an elongated body that has a flexible base portion and a speaker and microphone formed, wherein the base portion includes: (a) a second mechanical attachment member for securely, yet releasably, attaching the second audio component to the inside of the helmet proximate the other ear and mouth so as to permit the speaker to hover relative to the other ear but not be in contact therewith when the helmet is worn, and (b) a flexible elongated portion that attaches the speaker to the second mechanical attachment member and is configured to bend to assume a desired position in which the speaker hovers relative to the other ear, while the second mechanical attachment member remains attached to the inside of the helmet, the second audio component being in communication with but spaced from the main communication module.

2. The communications system of claim 1, wherein the flexible elongated portion of the base portion of each of the first and second audio components is formed of a flexible material, each speaker positioned to directly face a head of the user, when the helmet is worn, to project sound to the respective ear.

3. The communications system of claim 2, wherein the base portion of each of the first and second audio components is formed of a flexible strip of fabric and each of the first and second mechanical attachment members comprises a hook and loop material that mates with complementary hook and loop material that is located along the inside of the helmet.

4. The communications system of claim 3, wherein the flexible strip of material is formed of hook and loop material.

5. The communications system of claim 3, wherein the flexible strip of material includes one or more pieces of hook and loop material that is attached thereto and the flexible elongated portion comprises a tubular structure.

6. The communications system of claim 1, wherein the first and second audio components are electronically connected to the main communications module by wires that extend along the interior of the helmet and terminate in a common first connector that extends through one opening formed in the outer shell and is fixedly held within the cradle to allow the first connector to mate with a second connector that is part of the main communications module so as to form an electrical connection therebetween when the main communications module is inserted into and mated with the cradle.

7. The communications system of claim 1, wherein the main communications module includes a first part that passes through a plurality of openings formed in the outer shell and is coupled to the outer shell and includes a third mechanical attachment member for securely attaching the main communications module to the outer shell.

8. The communications system of claim 7, wherein the third mechanical attachment member is a snap-fit attachment member that permits the main communications module to be snap-fittingly attached to the first part.

9. The communications system of claim 8, wherein the third mechanical attachment member comprises a pair of flexible locking fingers that engage openings formed in the main communications module for releasably locking the main communications module to the first part.

10. The communications system of claim 7, wherein the first part comprises a flexible strip of fabric material that includes a coupling member that slidingly travels thereover, the coupling member including the third mechanical attachment member, the flexible strip of fabric material passing through a pair of openings formed in the outer shell and being attached to itself to form a continuous loop.

11. The communications system of claim 10, wherein the flexible strip of fabric material includes hook and loop material for attaching one portion of the flexible strip of fabric material to another portion of the flexible strip of fabric material.

12. The communications system of claim 1, wherein the first audio component and the second audio component each further includes an antenna that extends rearwardly from the main portion and provides wireless communication between the first and second audio components and main communications module.

13. The communications system of claim 1, wherein one of the first and second audio components includes an adjustable microphone that is operatively connected to the main communications module.

14. The communications system of claim 1, wherein the main communications module comprises an electronic module that includes controls.

15. The communications system of claim 8, wherein the main communications module is configured to communicate with and/or operate as a digital media player, a radio tuner, a telephone, or a global positioning system (GPS).

16. The communications system of claim 1, wherein the main communications module is configured to communicate with another device using Bluetooth technology.

17. The communications system of claim 16, wherein the main communications module is configured to communicate or operate as a digital media player, a radio tuner, a navigation system, or a cellular phone.

18. A communications system in combination with a helmet that includes vent openings formed in an outer shell thereof comprising:
a main communications module that is configured to be attached to an exterior of the outer shell of the helmet, the main communications module including a base portion that contains the electronics and another separate part that is mounted to the helmet by being passed through openings of the outer shell, the base portion being removably attached to the separate part that is mounted to the helmet, the base portion being attached to the separate part such that a location of the base portion can be adjusted relative to the separate part;
a first audio component that is formed of an elongated body that has a flexible base portion and a speaker that extends outwardly from the base portion, wherein the base portion includes a first mechanical attachment member for securely, yet releasably, attaching the first audio component to a second mechanical attachment member located inside of the outer shell of the helmet proximate one ear of a user, the first audio component being in communication with the main communication module; and
a second audio component that is formed of an elongated body that has a flexible base portion and a speaker and microphone that extend outwardly from the base portion, wherein the base portion includes a third mechanical attachment member for securely, yet releasably, attaching the second audio component to a fourth mechanical attachment member located inside of the outer shell of the helmet proximate the other ear, the second audio component being in communication with the main communication module;
wherein the first, second, third and fourth mechanical attachment members permit a location of the first and second audio components within the inside of the outer shell to be readily changed, thereby allowing a user to adjust the first and second audio components based on user preference;
wherein the first and second audio components are electronically connected to the main communications module by wires that extend along the interior of the helmet and terminate in a common first connector that extends through one opening formed in the outer shell and is fixedly held within the cradle to allow the first connector to mate with a second connector that is part of the main communications module so as to form an electrical connection therebetween when the main communications module is inserted into and mated with the cradle.

19. The communications system of claim 18, wherein the first, second, third and fourth attachment members comprise hook and loop material.

20. The communications system of claim 18, wherein the separate other part of the main communications module comprises a flexible strap that passes through at least two openings of the outer shell and is attached to itself by hook and loop material, the flexible strap including a coupling member that is coupled thereto such that the coupling member can slidingly travel over the flexible strap, the coupling member including a fifth mechanical attachment member that mates with a sixth mechanical attachment member that is part of the base portion.

21. The communications system of claim 20, wherein the fifth and sixth mechanical attachment members form a snap-fit attachment when mated together.

22. A communications system for a helmet that includes vent openings formed in an outer shell thereof comprising:
a main communications module that is configured to be attached to an exterior of the outer shell of the helmet;
a first audio component that is formed of an elongated body that has a flexible base portion and a speaker, wherein the base portion includes: (a) a first mechanical attachment member for securely, yet releasably, attaching the first audio component to the helmet proximate one ear of a user so as to the speaker to hover relative to the one ear but not be in contact therewith when the helmet is worn, and (b) a flexible elongated portion that attaches the speaker to the first mechanical attachment member and is configured to bend to assume a desired position in which the speaker hovers relative to the one ear, while the first mechanical attachment member remains attached to the helmet, the first audio component being in communication with but spaced from the main communication module; and
a second audio component that is formed of an elongated body that has a flexible base portion and a speaker and microphone formed, wherein the base portion includes: (a) a second mechanical attachment member for securely, yet releasably, attaching the second audio component to the helmet proximate the other ear and mouth so as to permit the speaker to hover relative to the other ear but not be in contact therewith when the helmet is worn, and (b) a flexible elongated portion that attaches the speaker to the second mechanical attachment member and is configured to bend to assume a desired position in which the speaker hovers relative to the other ear, while the second mechanical attachment member remains attached to the helmet, the second audio component being in communication with but spaced from the main communication module.

23. The communications system of claim 22, wherein the flexible elongated portion of the base portion of each of the first and second audio components is formed of a flexible material, each speaker positioned to directly face toward a head of the user, when the helmet is worn, to project sound to the respective ear.

24. The communications system of claim 23, wherein the base portion of each of the first and second audio components is formed of a flexible strip of material and each of the first and second mechanical attachment members mates with a complementary attachment member that is located along a surface of the helmet so as to permit repositioning of the first and second audio components along the surface of the helmet.

\* \* \* \* \*